United States Patent
Messing et al.

(10) Patent No.: US 10,214,179 B2
(45) Date of Patent: Feb. 26, 2019

(54) STEERING COLUMN ASSEMBLY HAVING A LOCK MOUNTING BRACKET

(71) Applicant: Steering Solutions IP Holding Corporation, Saginaw, MI (US)

(72) Inventors: Nicholas M. Messing, Freeland, MI (US); Robert D. Maida, Pinconning, MI (US); Scott A. Stinebring, Auburn, MI (US); Robert W. Dubay, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 56 days.

(21) Appl. No.: 15/297,388

(22) Filed: Oct. 19, 2016

(65) Prior Publication Data

US 2017/0106835 A1 Apr. 20, 2017

Related U.S. Application Data

(60) Provisional application No. 62/243,404, filed on Oct. 19, 2015.

(51) Int. Cl.
*B60R 25/021* (2013.01)

(52) U.S. Cl.
CPC ......... *B60R 25/021* (2013.01); *B60R 25/0211* (2013.01); *B60R 25/02115* (2013.01); *B60R 25/02126* (2013.01)

(58) Field of Classification Search
CPC ............... B60R 25/021; B60R 25/0211; B60R 25/02115; B60R 25/02126
See application file for complete search history.

(56) References Cited

U.S. PATENT DOCUMENTS

| 1,329,391 | A | * | 2/1920 | Folster | B60R 25/02115 |
| | | | | | 307/10.3 |
| 1,360,616 | A | * | 11/1920 | Borck | B60R 25/02126 |
| | | | | | 220/210 |
| 1,364,198 | A | * | 1/1921 | Hempel | B60R 25/0211 |
| | | | | | 70/185 |
| 1,386,358 | A | * | 8/1921 | Paulson | B60B 23/00 |
| | | | | | 411/955 |
| 1,398,905 | A | * | 11/1921 | Luplow | B60R 25/02126 |
| | | | | | 70/185 |
| 1,496,894 | A | * | 6/1924 | Krautter | B60R 25/0211 |
| | | | | | 70/185 |
| 1,674,906 | A | * | 6/1928 | Lamb | B60R 25/02126 |
| | | | | | 70/185 |
| 1,736,900 | A | * | 11/1929 | Carpenter | B60R 25/0211 |
| | | | | | 70/185 |
| 3,602,018 | A | * | 8/1971 | Eisenman | B60R 25/066 |
| | | | | | 70/202 |

(Continued)

FOREIGN PATENT DOCUMENTS

| GB | 2287923 A | * 10/1995 | ....... B60R 25/02115 |
| JP | 2013189063 A | * 9/2013 | |

*Primary Examiner* — Laura Freedman
(74) *Attorney, Agent, or Firm* — Cantor Colburn LLP

(57) ABSTRACT

A steering column assembly includes a jacket assembly and a bracket. The bracket has a first end portion defining a first opening and a second end portion defining a second opening. The second end portion overlaps the first end portion such that the second opening and the first opening are proximately aligned.

11 Claims, 4 Drawing Sheets

(56) References Cited

U.S. PATENT DOCUMENTS

| | | | | |
|---|---|---|---|---|
| 4,318,288 A | * | 3/1982 | Rifat | B60R 25/0211 |
| | | | | 70/186 |
| 5,211,042 A | * | 5/1993 | Watanuki | B60R 25/02126 |
| | | | | 280/775 |
| 5,718,132 A | * | 2/1998 | Riefe | B60R 25/02105 |
| | | | | 180/277 |
| 2011/0193692 A1 | * | 8/2011 | Fong | B60R 25/00 |
| | | | | 340/426.11 |

* cited by examiner

STEERING COLUMN ASSEMBLY HAVING A LOCK MOUNTING BRACKET

CROSS-REFERENCES TO RELATED APPLICATIONS

This patent application claims priority to U.S. Provisional Patent Application Ser. No. 62/243,404, filed Oct. 19, 2015 which is incorporated herein by reference in its entirety.

BACKGROUND OF THE INVENTION

Steering columns are generally equipped with a mechanical or electrical locking mechanism. The locking mechanism contains a member, such as a bolt, that is actuated in some fashion to contact a feature that inhibits rotation of a steering shaft. This may prevent a perpetrator from turning a steering wheel attached to the steering shaft. Some perpetrators attempt to remove the locking mechanism in an attempt to abscond with the vehicle.

SUMMARY OF THE INVENTION

According to an embodiment of the present disclosure, a steering column assembly is provided. The steering column assembly includes a steering shaft assembly, a jacket assembly, a lock mounting bracket, and a locking mechanism. The steering shaft assembly has a locking feature. The jacket assembly is at least partially disposed about the steering shaft assembly. The lock mounting bracket is disposed on the jacket assembly. The locking mechanism extends at least partially through the lock mounting bracket. The locking mechanism includes a movable member that is arranged to selectively engage the locking feature.

According to another embodiment of the present disclosure, a steering column assembly is provided. The steering column assembly includes a jacket assembly and a lock mounting bracket. The locking mounting bracket is operatively connected to the jacket assembly. The lock mounting bracket includes a first end portion that defines a first opening and a second end portion that defines a second opening. The second end portion overlaps the first end portion. The second opening and the first opening are aligned.

According to yet another embodiment of the present disclosure, a lock mounting bracket is provided. The lock mounting bracket includes a first side that engages a locking mechanism and a second side that engages a jacket assembly. The first side and the second side each extend between a first end portion and a second end portion. The first end portion is disposed on the second end portion.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the figures, where the invention will be described with reference to specific embodiments, without limiting same, it is to be understood that the disclosed embodiments are merely illustrative examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the invention.

Figure 1:
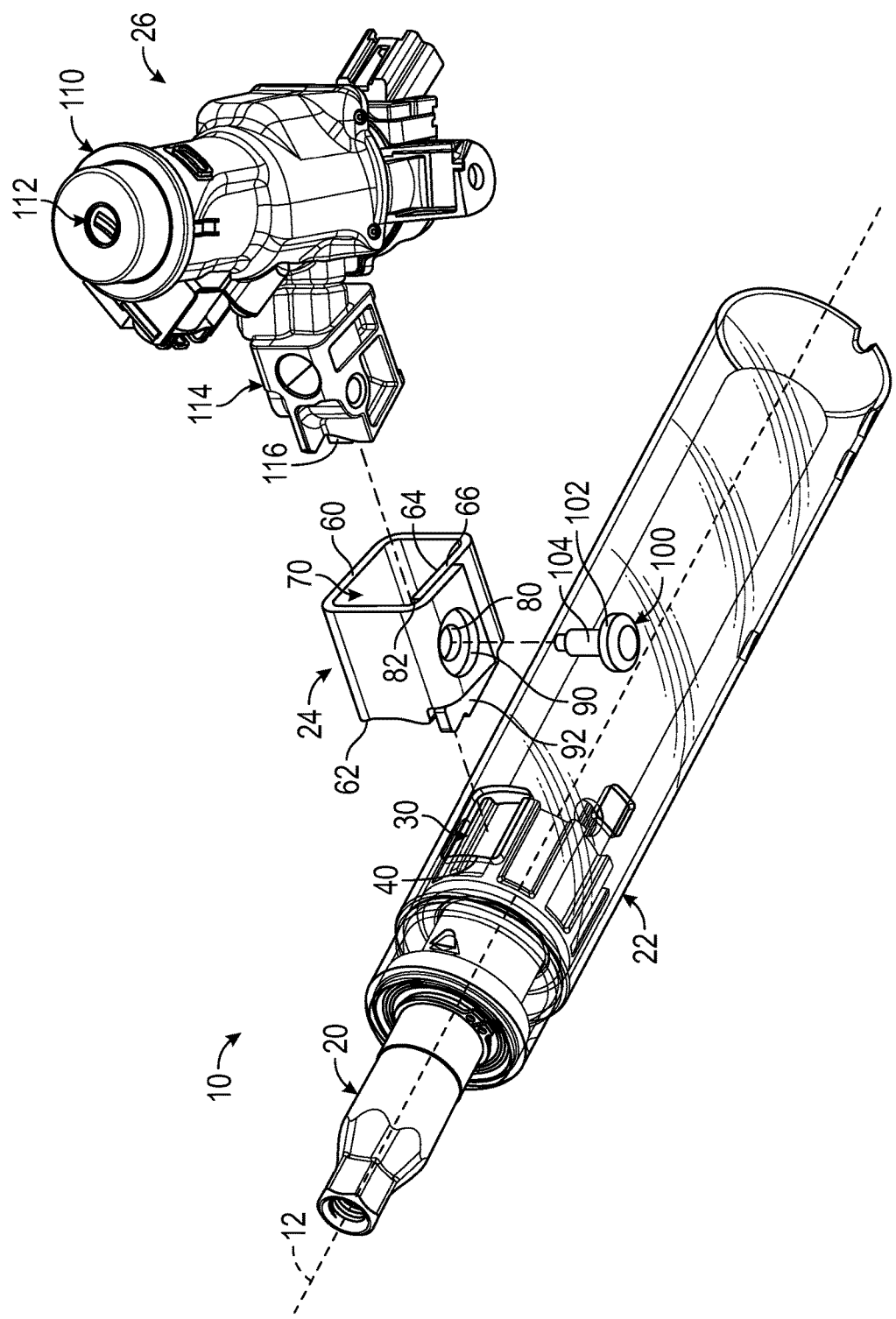
FIG. 1 is a disassembled view of a steering column assembly.
Figure 2:
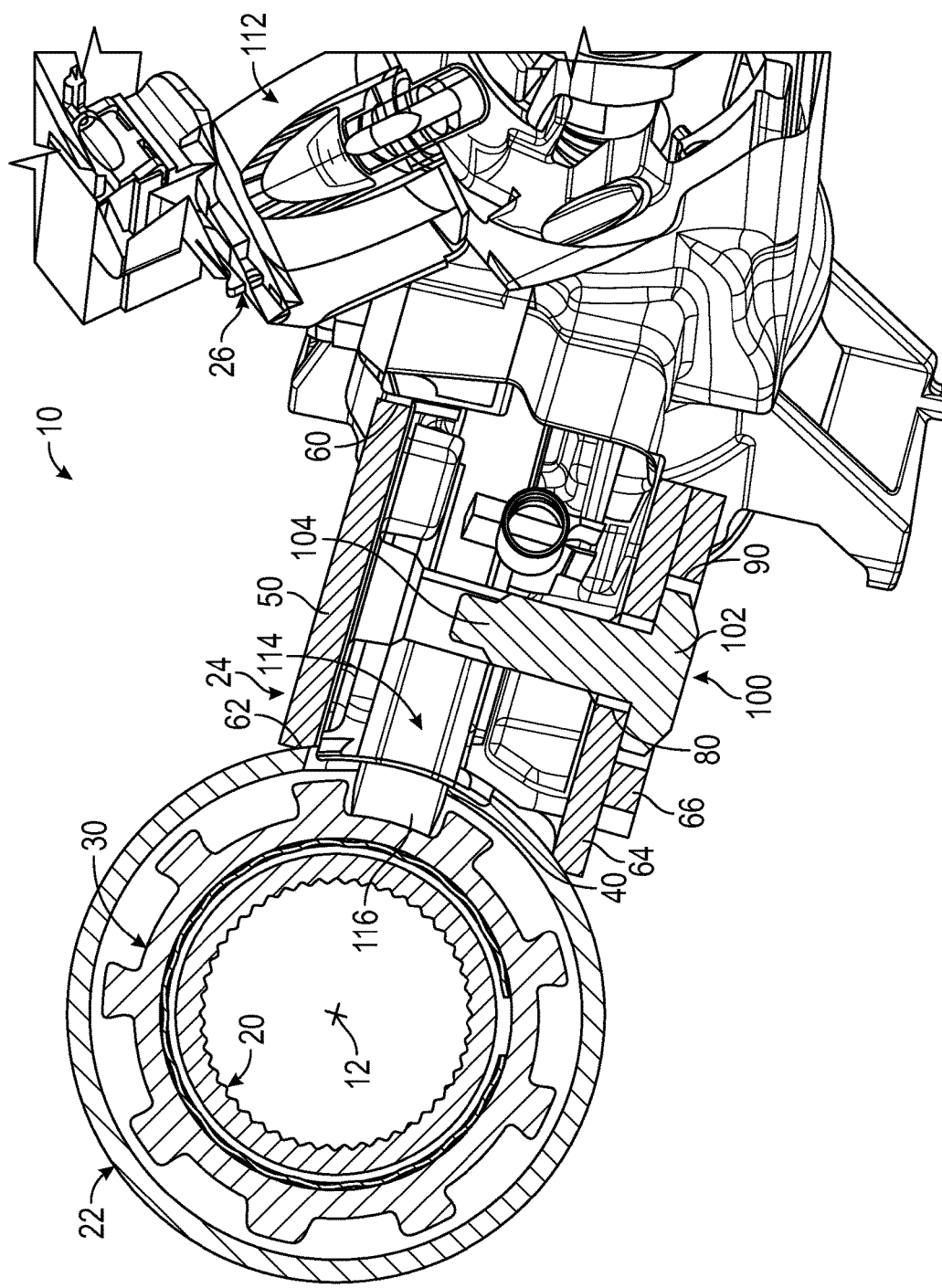
FIG. 2 is a partial cross-sectional view of the steering column assembly.
Figure 3:
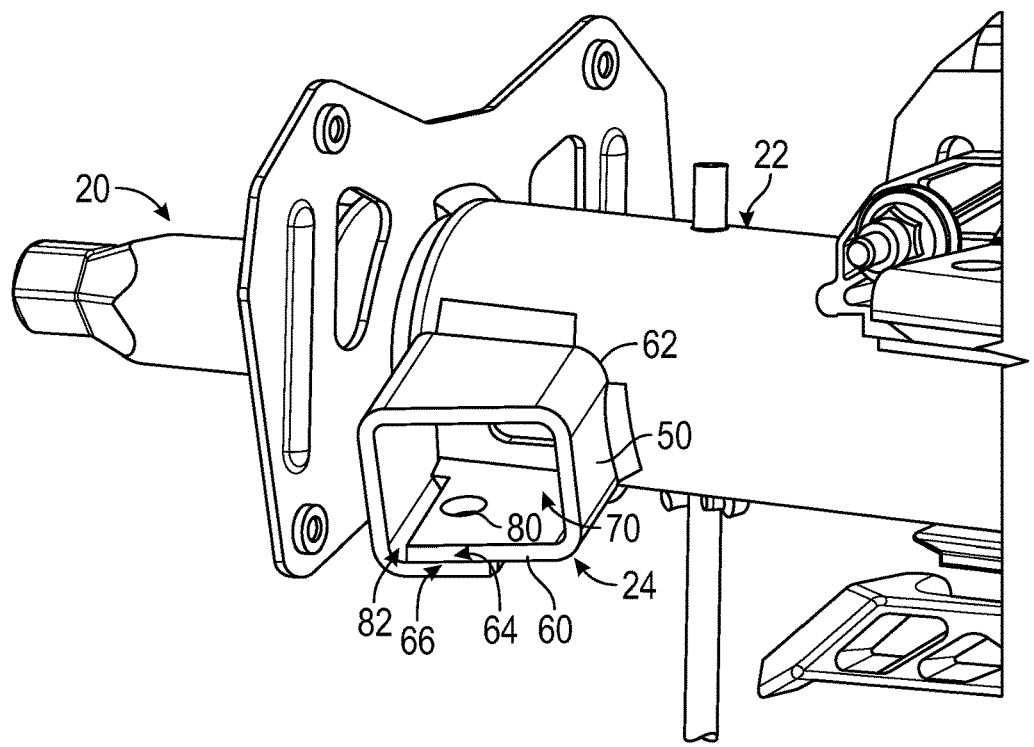
FIG. 3 is a perspective view of a lock mounting bracket of the steering column assembly.

Referring to FIGS. 1-3, a steering column assembly 10 is shown. The steering column assembly 10 extends along a steering column axis 12. The steering column assembly 10 includes a steering shaft assembly 20, a jacket assembly 22, a lock mounting bracket 24, and a locking mechanism 26.

The steering shaft assembly 20 extends along the steering column axis 12. The steering shaft assembly 20 is operatively connected to a steering wheel. The steering shaft assembly 20 includes a locking feature 30.

The locking feature may be a slot or other opening that is formed into the steering shaft assembly 20. The locking feature 30 may extend from an exterior surface of the steering shaft assembly 20 towards an interior surface of the steering shaft assembly 20.

The locking feature 30 may be a clutch lock that is disposed about the steering shaft assembly 20. The locking feature 30 is disposed between the steering shaft assembly 20 and the jacket assembly 22.

The jacket assembly 22 is operatively connected to a vehicle structure through a mounting bracket or other structure. The jacket assembly 22 extends along the steering column axis 12. The jacket assembly 22 defines an inner bore that receives at least a portion of the steering shaft assembly 20. The jacket assembly 22 is at least partially disposed about the steering shaft assembly 20. The jacket assembly 22 defines an opening 40 that is disposed proximate or over a portion of the locking feature 30. The opening 40 extends completely through the jacket assembly 22.

The lock mounting bracket 24 is disposed on the jacket assembly 22. The lock mounting bracket 24 is operatively connected to the jacket assembly 22. The lock mounting bracket 24 is disposed proximate and is at least partially received within the opening 40 of the jacket assembly 22.

The lock mounting bracket 24 includes a bracket body 50. The bracket body 50 includes a first side 60 and a second side 62 that is disposed opposite the first side 60.

The first side 60 and the second side 62 each extend between a first end portion 64 and the second end portion 66. The first side 60 engages the locking mechanism 26. The second side 62 engages and is disposed on the jacket assembly 22. The second side 62 is joined to the exterior surface of the jacket assembly 22 to couple the lock mounting bracket 24 to the jacket assembly 22. The bracket body 50 defines a receiving region 70 that extends from the first side 60 to the second side 62.

The first end portion 64 defines a first opening 80 and a first notch 82. The first opening 80 extends completely through the first end portion 64. The first opening 80 is disposed substantially transverse to the receiving region 70. The first opening 80 has a first diameter. The first notch 82 is disposed proximate a distal end of the first end portion 64. The first notch 82 extends from the first side 60 towards the second side 62. The first notch 82 does not extend completely through the first end portion 64.

Figure 4:
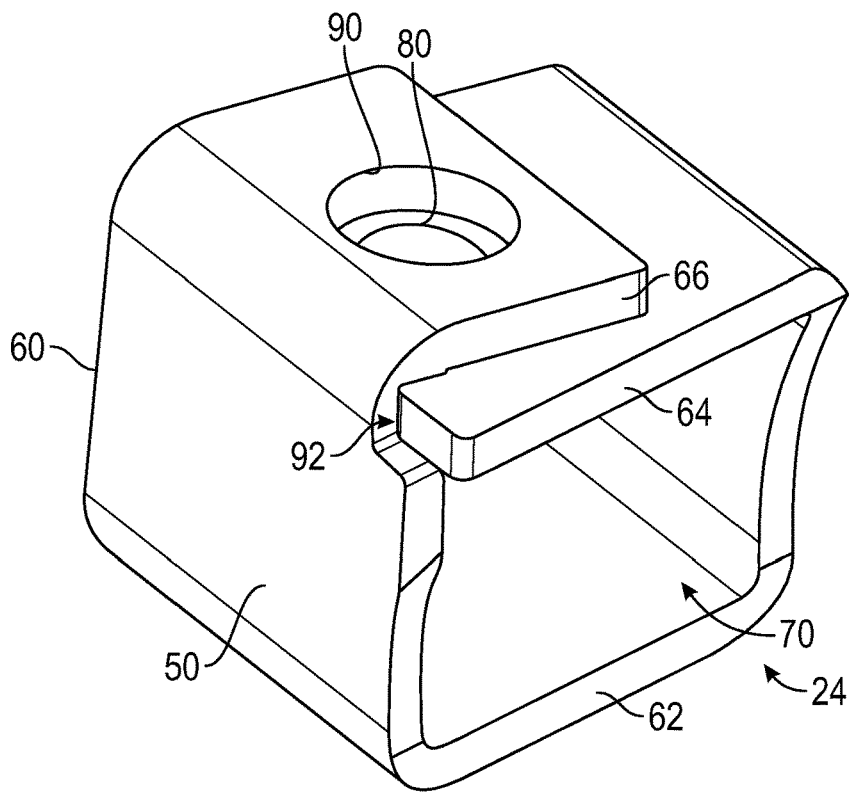
FIG. 4 is a bottom perspective view of the lock mounting bracket.
Figure 5:
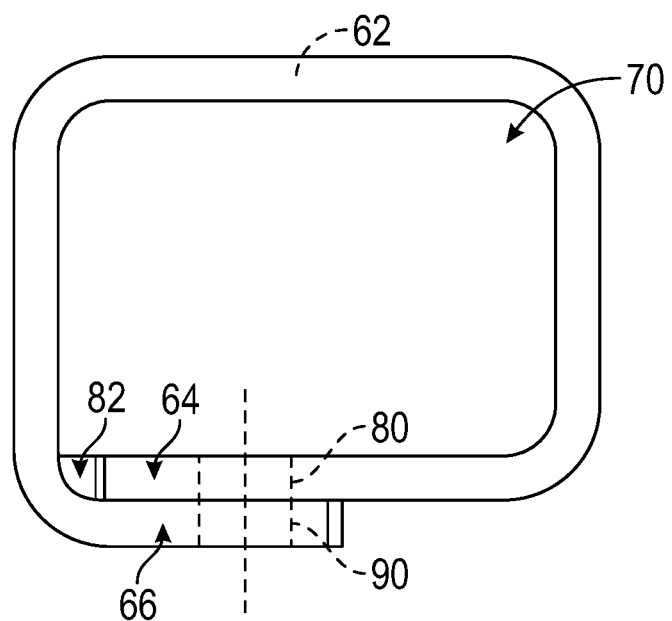
FIG. 5 is a side view of the lock mounting bracket.

The second end portion 66 defines a second opening 90 and the second notch 92. The second opening 90 extends completely through the second end portion 66. The second opening 90 is disposed substantially transverse to the receiving region 70. The second opening 90 is disposed substantially parallel to the first opening 80. The second opening 90 has a second diameter that is greater than the first diameter. As shown in FIG. 4, the second notch 92 is disposed proximate a distal end of the second end portion 66. The second notch 92 extends from the second side 62 towards the first side 60. The second notch 92 does not extend completely through the second end portion 66. The second notch 92 enables at least a portion of the first end portion 64 disposed proximate the second side 62 to be at least partially received within the opening 40.

As shown in FIGS. 1-5, the lock mounting bracket 24 is configured as a wrap bracket wherein the first end portion 64 is disposed on the second end portion 66. The second end portion 66 overlaps the first end portion 64 such that the second opening 90 is aligned with the first opening 80 and forms a counterbore. The first opening 80 and the second opening 90 are each offset from a centerline that bisects the lock mounting bracket 24. The first end portion 64 is joined to the second end portion 66.

A fastener 100 is received within and extends at least partially through the first opening 80 and the second opening 90 to couple the locking mechanism 26 to the lock mounting bracket 24. The fastener 100 ultimately couples the locking mechanism 26 to the jacket assembly 22. The fastener 100 includes a fastener head 102 and a fastener body 104 extending from the fastener head 102. The fastener head 102 is received within the second opening 90. The fastener body 104 extends through the first opening 80.

The fastener head 102 does not extend beyond a surface of the second end portion 66. The fastener head 102 engages a surface of the first end portion 64. The depth of the second opening 90 and/or the first opening 80 along with a thickness of the second end portion 66 and/or the first end portion 64 inhibits a person from being able to shear or pry the fastener head 102 by denying access to the bottom of the fastener head 102. As such, the lock mounting bracket 24 is configured as an anti-theft bracket.

The locking mechanism 26 is operatively connected to the jacket assembly 22 through the lock mounting bracket 24. The locking mechanism 26 includes an ignition lock actuator assembly 110 that is operatively connected to a vehicle ignition switch. The ignition lock actuator assembly 110 includes a keyed cylinder 112, an extension portion 114, and a movable member 116.

The ignition lock actuator assembly 110 is configured to selectively actuate the vehicle ignition switch in response to a position of the keyed cylinder 112. The vehicle ignition switch is configured to selectively control the operational state of the vehicle. The vehicle ignition switch is movable between various positions that correspond to various operational states of the vehicle.

The extension portion 114 extends from the keyed cylinder 112 towards the locking feature 30. The extension portion 114 is at least partially received within the receiving region 70 of the lock mounting bracket 24 such that the extension portion 114 of the locking mechanism 26 extends at least partially through the lock mounting bracket 24. The fastener 100 extends through at least one of the first opening 80 and the second opening 90 and is received within a fastener opening formed within the extension portion 114.

The movable member 116 is configured as a lock bolt. The movable member 116 is movable between an extended and a retracted position relative to the extension portion 114. The movable member 116 is arranged to selectively engage the locking feature 30. The movable member 116 is configured to engage the locking feature 30 to inhibit rotation of the steering shaft assembly 20 while in the extended position. Any torsional input into the steering shaft assembly 20 is translated into the lock mounting bracket 24 while the movable member 116 is in the extended position. The movable member 116 is configured to be spaced apart from the locking feature 30 to facilitate or permit rotation of the steering shaft assembly 20 while in the retracted position.

Throughout this specification, the term "attach," "attachment," "connected", "coupled," "coupling," "mount," or "mounting" shall be interpreted to mean that one structural component or element is in some manner connected to or contacts another element—either directly or indirectly through at least one intervening structural element—or is integrally formed with the other structural element.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
   a jacket assembly; and
   a lock mounting bracket operatively connected to the jacket assembly, the lock mounting bracket having:
      a first end portion defining a first opening,
      a second end portion defining a second opening, the second end portion overlaps the first end portion,
      a first side, and
      a second side disposed opposite the first side and the second side engages the jacket assembly, the first side and the second side each extending between the first end portion and the second end portion, the first end portion defines a first notch that extends from the first side towards the second side and the second end portion defines a second notch that extends from the second side towards the first side.

2. The steering column assembly of claim 1, wherein the first opening has a first diameter.

3. The steering column assembly of claim 2, wherein the second opening has a second diameter.

4. The steering column assembly of claim 3, wherein the second diameter is greater than the first diameter.

5. The steering column assembly of claim 1, wherein the lock mounting bracket defines a receiving region that extends from the first side to the second side and is disposed transverse to at least one of the first opening and the second opening.

6. A lock mounting bracket, comprising:
   a bracket body having a first side that engages a locking mechanism and a second side that engages a jacket assembly, the first side and the second side each extending between a first end portion having a first opening and a second end portion having a second opening that is aligned with the first opening, the first end portion is disposed on the second end portion, and a fastener body that extends through the first opening and a fastener head received within the second opening, the fastener head engages a surface of the first end portion.

7. The lock mounting bracket of claim 6, the second end portion overlaps the first end portion.

8. The lock mounting bracket of claim 6, wherein the first opening has a first diameter and the second opening has a second diameter that is greater than the first diameter.

9. The lock mounting bracket of claim 6, wherein the second end portion is joined to the first end portion.

10. The lock mounting bracket of claim 6, wherein the first end portion defines a first notch that extends from the first side towards the second side.

11. The lock mounting bracket of claim 10, wherein the second end portion defines a second notch that extends from the second side towards the first side.

\* \* \* \* \*